No. 749,207. PATENTED JAN. 12, 1904.
G. C. MACKROW & H. G. CAMERON.
DEPOSITORY FOR COAL OR THE LIKE.
APPLICATION FILED JUNE 4, 1903.

NO MODEL. 5 SHEETS—SHEET 1.

Witnesses
Thomas Durant
Arrant Church

Inventors:
George C. Mackrow &
Herbert G. Cameron
by Church
their attys.

No. 749,207. PATENTED JAN. 12, 1904.
G. C. MACKROW & H. G. CAMERON.
DEPOSITORY FOR COAL OR THE LIKE.
APPLICATION FILED JUNE 4, 1903.
NO MODEL. 5 SHEETS—SHEET 4.

No. 749,207. PATENTED JAN. 12, 1904.
G. C. MACKROW & H. G. CAMERON.
DEPOSITORY FOR COAL OR THE LIKE.
APPLICATION FILED JUNE 4, 1903.
NO MODEL. 5 SHEETS—SHEET 5.

No. 749,207. Patented January 12, 1904.

UNITED STATES PATENT OFFICE.

GEORGE COLBY MACKROW AND HERBERT GEORGE CAMERON, OF BLACK-WALL, LONDON, ENGLAND.

DEPOSITORY FOR COAL OR THE LIKE.

SPECIFICATION forming part of Letters Patent No. 749,207, dated January 12, 1904.

Application filed June 4, 1903. Serial No. 160,069. (No model.)

*To all whom it may concern:*

Be it known that we, GEORGE COLBY MACKROW and HERBERT GEORGE CAMERON, subjects of the King of England, and residents of Blackwall, London, England, have invented certain new and useful Improvements in or Relating to Depositories for Coal or other Broken or Granulated Material, of which the following is a specification.

This invention relates to improvements in depositories for coal or other broken or granulated material, and has for its object to provide means by which the material may be stored in such manner that it may be rapidly bagged while in the depository and transported to a convenient position therein for final delivery.

The invention has particular reference to the storage of coal for shipping, in which case the depository is preferably built to float so that it may be towed, or provided with engines by which it may be steamed to the position occupied by the vessel or vessels requiring coal.

In the preferred embodiment of the invention the depository comprises an upper storage provided with a sloping floor having an outlet at its lower side, so that the material stored may gravitate down the sloping floor to a lower chamber. In the lower chamber beneath the outlet in the floor of the upper chamber is a receiving-table, upon which the material falls and comes to rest. From this table the material is preferably raked by hand into bags or other receptacles, each of which when filled is attached to a transporting device, hereinafter described. The transporting device carries the charged receptacles to a convenient point in the depository, from whence they may be finally delivered.

In the accompanying drawings, which illustrate one method of carrying out this invention.

Like letters indicate like parts throughout the drawings.

The depository is provided with outer walls A so shaped that the whole may be floated, these walls being strutted and stayed in any well-known manner, and the body of the depository is divided longitudinally by a partition A'.

Figure 3:
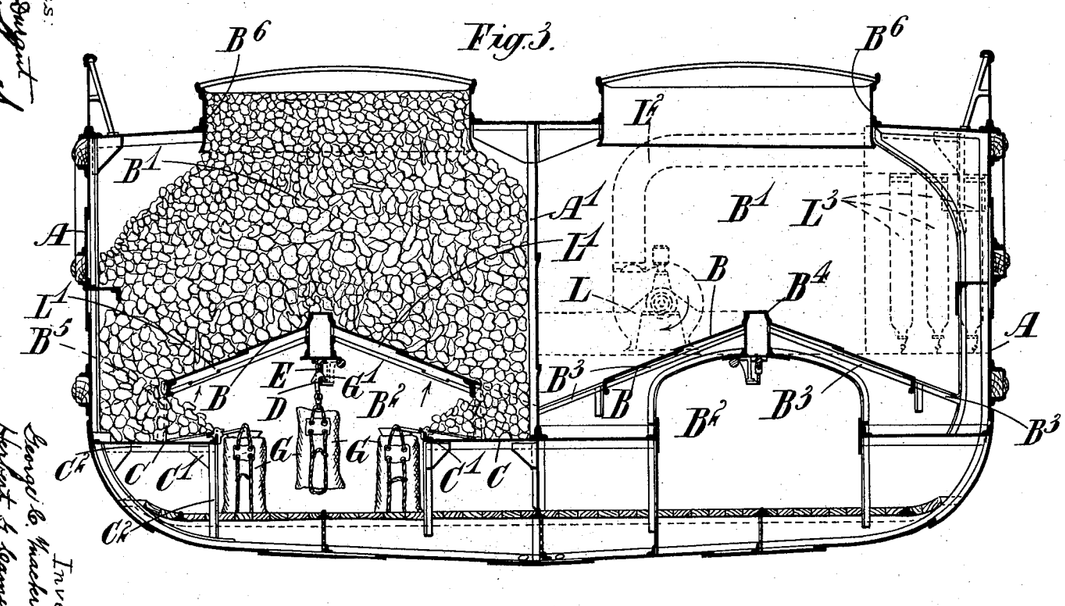
Fig. 3 is a section on the line 3 3 of Fig. 1.

At a convenient height in each half of the depository a double sloped or arched floor B, Fig. 3, is provided, by which each section is divided into upper and lower chambers B' B$^2$, respectively. The lower sides of the floor B do not extend to the opposed walls of the chamber, so that a space is left between the side portions of the floor and the opposite walls through which material deposited in the chamber B' may pass down into the chamber B$^2$. By this means an open space is provided on either side of the chamber extending conveniently throughout the whole of the available length of that section of the depository, and beneath each of these side spaces in the chamber B$^2$ is a receiving-table C. Each receiving-table extends beneath the whole of the length of its respective discharging-space and also projects inwardly beneath the floor B, as indicated at C'. The receiving-tables are supported by suitable vertical and horizontal members C$^2$, secured to the frame of the depository, and the floor B is carried by transverse struts B$^3$, connected at one end to the walls of the chamber B' and at the other end to a central longitudinal member B$^4$, while alternate transverse members are supported from the receiving-tables C by vertical members B$^5$.

Secured beneath the central longitudinal member B$^4$ and supported by any convenient means is a stationary transporting-rail D, which lies parallel with the receiving-tables C and midway between them. Above this rail is a bar E, reciprocated by any convenient mechanism. (Not shown in the drawings.) The bar slides in lugs E', Figs. 6 and 7, and carries a series of pawls F, pivoted to it.

Figure 6:
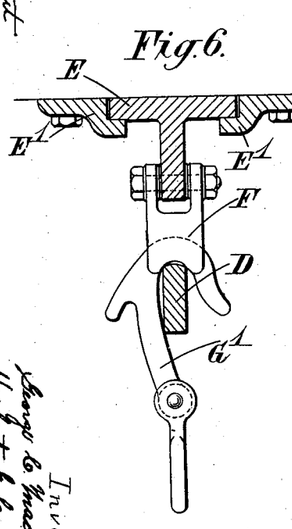
Fig. 6 is an end elevation, in part section on an enlarged scale, of a detail of the invention.
Figure 7:
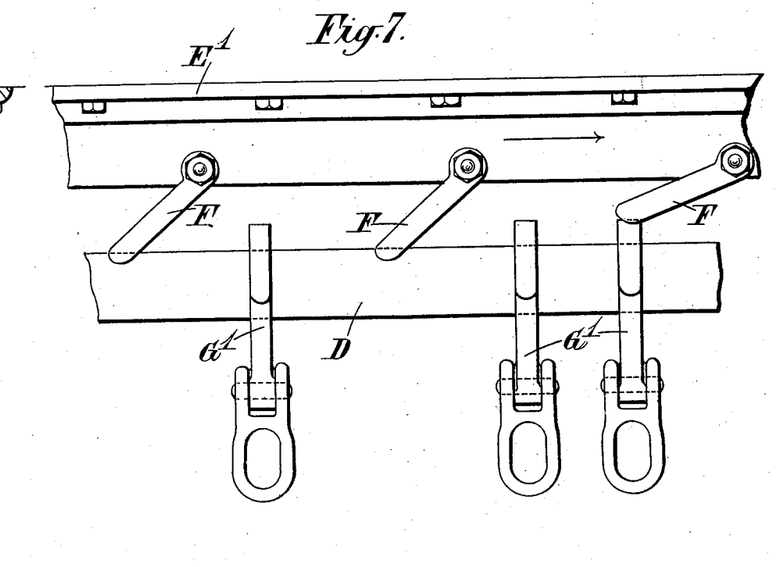
Fig. 7 is a side elevation of a portion of the device shown in Fig. 6.

The free ends of the pawls rest upon the rail D and are reciprocated thereon by the movement of the bar E.

Figure 2:
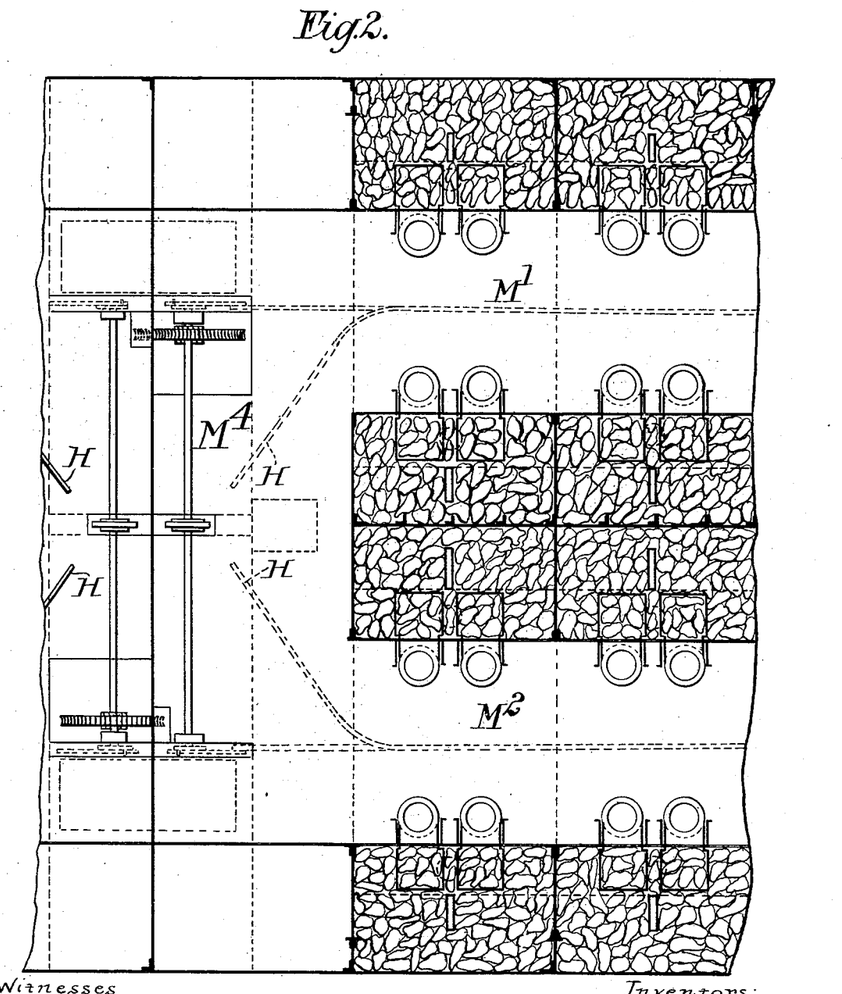
Fig. 2 is a similar view of part of Fig. 1 on an enlarged scale.

The bagging of the materials stored in this depository is effected as follows: The material, which we are assuming to be coal, is stored in the chamber B', which may be charged through one or more mouths or hatchways $B^6$, the number of these being varied according to the length of the chamber. The coal falls upon the double sloped or arched floor B and gravitates to the left and right of the central member $B^4$, as indicated by the arrows, Fig. 3, and falls through the open spaces at the sides of the compartments onto the tables C in the chamber $B^2$. On reaching the table C a portion of the coal falls forward upon the part C' of each table and prevents further descent of coal from the chamber B' until removed. A series of men or baggers are stationed at each table, preferably in twos, so that two men may work together between each pair of struts $B^3$, which cross the spaces by which the coal passes from the upper chamber to the lower. These men rake the coal into bags, (indicated at G.) Each bag is provided with a hook G' and when filled is lifted and hung by its hook upon the transporting-rail D. Bags may be hung on the rail D at any point, and as the bar E, with its pawls F, reciprocates, the pawls engage the hooks when traveling in one direction and carry them forward upon the rail D; but during the backward movement of the bar E they rise over the hooks without moving them. By this means the bags are carried to the end of the transporting-rail, (shown at H, Fig. 2,) where they may be dumped or carried away by any convenient mechanism for final delivery from the depository. The men preferably work in pairs, as described above, as it requires two men to lift a charged bag onto the transporting-rail D, and the distance between the supporting members $B^3$ of the floor B, which cross the spaces by which the coal enters the lower chamber, is so adjusted as to allow a sufficient quantity of coal to pass between them to keep two men employed.

Figures 4, 5:
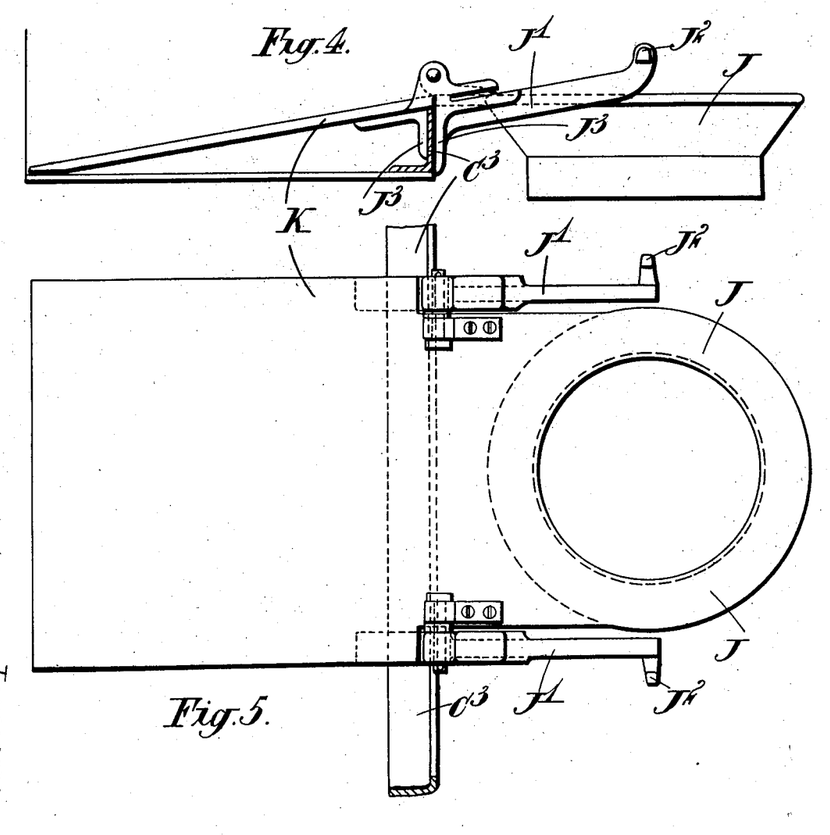
Fig. 4 is a side elevation of a detail of the invention on an enlarged scale.
Fig. 5 is a plan of the same.

For guiding the coal from the tables C to the bags a funnel J is provided for each man. The funnel projects from the edge of the table C and is hinged to a plate K, one end of which rests upon an upright edge or beading $C^3$, with which the table is provided, to prevent coal from falling therefrom, while the other end rests upon the table. The plate is provided with lugs $J^3$ to engage the beading, upon which it rests. Arms J', projecting on either side of the funnel, are secured to the plate and carry ears or lugs $J^2$, by which the bags may be suspended, while the funnel J maintains the top of the bag open. The coal is readily raked up the plate K, which serves as a guide to the funnel J, whence it falls readily into the bag or other receptacle placed beneath it. When not in use, the funnels J may be swung back upon their hinges, so that they lie above the table C. The whole device is preferably made detachable, so that it may readily be shifted to any desired position on the table.

The central longitudinal member $B^4$, Fig. 3, which supports the floor B, is conveniently made hollow and communicates with an air-extractor L of any desired construction. Radiating from the trunk or hollow member $B^4$ at the required intervals are tributary trunks L', each of which communicates with the chamber $B^2$ at a point above each pair of baggers. The extractor L thus creates a current of air from the chamber $B^2$ toward the open ends of the tributary trunks L', so that the dust raised during bagging is carried away to the extractor. The extractor discharges by a conduit, (indicated at $L^2$,) which at its free end communicates with a series of filters $L^3$, conveniently made of canvas or other finely-woven material. The dust is thus retained by the filters $L^3$, while the air escapes through the interstices of the material. These filters may be placed in any convenient part of the depository.

Figure 1:
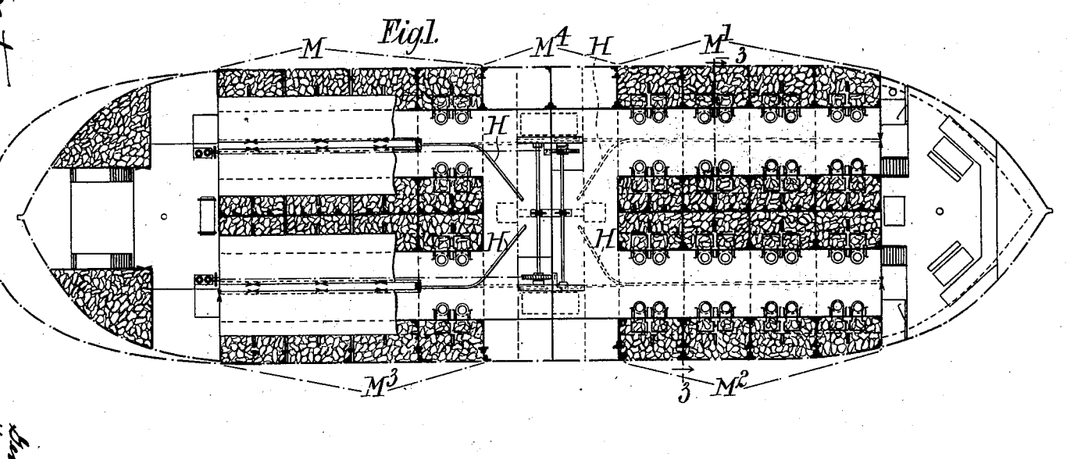
Figure 1 is a plan, in part section, of a floating depository.

The floating depository (shown in the drawings) is divided into four sections, (marked M, M', $M^2$, and $M^3$, respectively, Fig. 1,) each section being a facsimile of the other and provided with means for transporting charged bags to a central position, (indicated at $M^4$,) from which they are finally delivered from the depository by means of apparatus which does not constitute part of this invention.

Obviously the floor B of the chamber B' may be sloped in one direction only, if desired, so that the chamber $B^2$ is provided with only one table C and one series of men employed for bagging; but by the arrangement shown in the drawings a double number of men can be employed at the same time and bagging consequently effected in half the time that would otherwise be occupied. Also the transporting-rail D, with the reciprocating bar E and pawls F, serves in this case for both sets of men.

Although the arrangement described is especially intended for a floating depository, it will be understood that the same may be built as a fixed structure or, if floating, adapted to be either moored permanently in one position or transported from place to place, according to requirements.

A depository of the kind described may obviously be employed for storing and handling grain and other substances as well as coal.

The opening in the lower side of the floor B is preferably formed by constructing the floor in such a manner that that side is free of the adjacent wall, so that an opening is left between the lower side of the floor and the wall, which opening extends along the whole length of the chamber or compartment. This side of the floor may be supported entirely by the members B⁵, referred to, the struts B³ crossing the space between the floor and the wall being dispensed with. This feature is of considerable importance in dealing with coal, as it is found that when a comparatively small opening is employed for discharging the coal from one compartment to another the coal at times fails to feed through the opening by arching across the same, so that a rigid wall is formed which interrupts the automatic discharge. Although the struts B³, already described, cross the discharge-opening (shown in the drawings) and divide it more or less into a series of smaller openings, these do not impede the passage of the coal to such an extent as to allow serious difficulties from this source, as the space between each pair of struts may be sufficiently long to prevent an arch forming over the whole of the area contained between any two struts. This allows the end of the arch to be attacked, so that the whole collapses and feeding of the coal continues, or, if an arch did form over the whole of the space between any two struts, its end could be attacked from a point farther down the compartment. In addition to the rapid handling of the coal enabled by employing a long receiving-table beneath the discharge-opening a further advantage is obtained by a considerable quantity of coal being exposed to view upon this table, so that large masses may be selected and broken up before passing them into the bags or other receptacles for removal from the depository.

It will be seen that in gravitating down to the table C the coal first travels along the floor B toward the wall adjacent to the lower side of the floor and then passing through the opening travels in an opposite direction, so that large masses are prevented from falling from the upper part of the chamber B' direct to the table C, which might result in injury to those employed in bagging the coal.

What we claim as our invention, and desire to secure by Letters Patent, is—

1. In a depository for coal or other broken or granulated material, the combination with a sloping partition dividing the depository into an upper chamber for the material and a lower chamber into which the material is received and handled, an outlet at the lower part of the partition through which the material may gravitate to the lower chamber, and a receiving-table in the lower chamber below the outlet upon which the material falls and comes to rest and from which it may be subsequently removed; substantially as described.

2. In a depository for coal or other broken or granulated material the combination of an upper chamber, a lower chamber, a stationary sloping floor between these chambers, an outlet at the lower part of this floor through which the material may gravitate to the lower chamber, a receiving-table in the lower chamber situated beneath the outlet in the floor of the upper chamber, portable receptacles to receive the material removed from the table and means for removing the receptacles when charged, as set forth.

3. In a depository for coal or other broken or granulated material the combination of an upper chamber, a lower chamber, a stationary sloping floor between these chambers, an outlet at the lower part of this floor through which the material may gravitate to the lower chamber, a receiving-table in the lower chamber situated beneath the outlet in the floor of the upper chamber, portable receptacles to receive the material from the table, a guide projecting from the table and extending over the receptacle to be charged, whereby the material may be guided to the receptacle as set forth.

4. In a depository for coal or other broken or granulated material the combination of an upper chamber, a lower chamber, a sloping floor between these chambers, an outlet at the lower part of this floor through which the material may gravitate to the lower chamber, a receiving-table in the lower chamber situated beneath the outlet in the floor of the upper chamber, portable receptacles to receive the material removed from the table, and means for drawing off dust from the lower chamber as set forth.

5. In a depository for coal or other broken or granulated material the combination of an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed beneath the outlet between the lower side of the floor and the opposed wall of the chamber the table extending beneath the whole of the length of the outlet so that the material may be removed from several points simultaneously and projecting inwardly beneath the floor, and means for transporting the material removed as set forth.

6. In a depository for coal or other broken or granulated material the combination of an upper chamber a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed beneath the outlet between the lower side of the floor and the opposed wall of the chamber, the table extending beneath the whole of the length of the outlet so that the material may be removed from several points simultaneously and projecting inwardly beneath the floor, portable receptacles to receive the material as it is removed from the table, a stationary transporting-rail suspended in the lower chamber parallel to the receiving-table, hooks for suspending the receptacles from this rail, and means for moving the receptacles along the rail to the point at which it is desired they shall be delivered as set forth.

7. In a depository for coal or other broken or granulated material the combination of an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed beneath the outlet between the lower side of the floor and the opposed wall of the chamber the table extending beneath the whole of the length of the outlet so that the material may be removed from several points simultaneously and projecting inwardly beneath the floor, portable receptacles to receive the material as it is removed from the table, a stationary transporting-rail suspended in the lower chamber parallel to the receiving-table, hooks for suspending the receptacles from this rail, a reciprocating bar parallel with the rail, pawls on this bar their free ends resting upon the rail and adapted to reciprocate upon it and coöperate with the hooks by which the receptacles are suspended for the purpose of moving the receptacles along the rail to the point at which it is desired that they shall be delivered as set forth.

8. In a depository for coal or other broken or granulated material, the combination with a receiving-table, a funnel projecting from said table, a plate secured to the funnel and extending therefrom onto the table, whereby the material may be guided to the funnel; substantially as described.

9. In a depository for coal or other broken or granulated material, the combination with the receiving-table, of a funnel projecting therefrom over the receptacle to be charged, a guide-plate adapted to engage the edge of the table, and a hinge connection between the funnel and guide-plate, substantially as and for the purpose set forth.

10. In a depository for coal or other broken or granulated material, the combination with the receiving-table, of a funnel projecting therefrom over the receptacle to be charged, a guide-plate engaging the edge of the table for conducting the material to the funnel, a hinge for connecting the funnel to the guide-plate and means for suspending the receptacle while charging; substantially as described.

11. In a depository for coal or other broken or granulated material the combination of an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed beneath the outlet between the lower side of the floor and the opposed wall of the chamber the table extending beneath the whole of the length of the outlet so that the material may be removed from several points simultaneously and projecting inwardly beneath the floor, an air-extractor, a main air-trunk parallel with the receiving-table and communicating with the air-extractor, transverse tributary trunks communicating at one end with the main trunk and each provided at the other end with a mouth situated above one of the points on the table from which the material is removed during delivery from the depository and a discharge-outlet for the extractor, as set forth.

12. In a depository for coal or other broken or granulated material the combination of an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed beneath the outlet between the lower side of the floor and the opposed wall of the chamber the table extending beneath the whole of the length of the outlet so that the material may be removed from several points simultaneously and projecting inwardly beneath the floor, an air-extractor, a main air-trunk parallel with the receiving-table and communicating with the air-extractor, transverse tributary trunks communicating at one end with the main trunk and each communicating at the other end with the lower chamber above one of the points on the table from which the material is removed during delivery from the depository, a discharge-outlet for the extractor, and filters of perforated material to receive the discharge, as set forth.

13. In a depository for coal or other broken or granulated material the combination of an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed beneath the outlet between the lower side of the floor and the opposed wall of the chamber the table extending beneath the whole of the length of the outlet so that the material may be removed from several points simultaneously and projecting inwardly beneath the floor, means for transporting the material removed and exterior walls to the depository by which the whole may be floated, as set forth.

14. In a depository for coal or other broken or granulated material the combination of an upper chamber, a lower chamber an arched floor between these chambers, means for supporting this floor so that the lower sides are free of the opposed walls leaving an outlet on each side through which the material may gravitate down to the chamber below, receiving-tables in the lower chamber disposed on opposite sides of the chamber one beneath each of the outlets between the floor and opposed walls of the upper chamber each table extending beneath the whole of the length of its respective outlet so that the material may be removed from several points simultaneously and projecting inwardly beneath the floor, and means for transporting the material removed, as set forth.

15. In a depository for coal or other broken or granulated material the combination of an upper chamber, a lower chamber, an arched floor between these chambers, means for supporting this floor so that the lower sides are free of the opposed walls leaving an outlet on each side through which the material may gravitate down to the chamber below, receiving-tables in the lower chamber disposed on opposite sides of the chamber one beneath each of the outlets between the floor and opposed walls of the upper chamber each table extending beneath the whole of the length of its respective outlet so that the material may be removed from several points simultaneously and projecting inwardly beneath the floor, portable receptacles to receive the material as it is removed from the tables, a stationary transporting-rail suspended in the lower chamber parallel to the receiving-tables and approximately midway between them, hooks for suspending the receptacles from this rail, and means for moving the receptacles along the rail to the point at which it is desired that they shall be delivered, as set forth.

16. In a depository for coal or other broken or granulated material the combination of an upper chamber, an arched floor between these chambers, means for supporting this floor so that the lower sides are free of the opposed walls leaving an outlet on each side through which the material may gravitate down to the chamber below, receiving-tables in the lower chamber disposed on opposite sides of the chamber one beneath each of the outlets between the floor and opposed walls of the upper chamber each chamber extending beneath the whole of the length of its respective outlet so that the material may be removed from several points simultaneously and projecting inwardly beneath the floor, portable receptacles to receive the material as it is removed from the tables, a stationary transporting-rail suspended in the lower chamber parallel to the receiving-tables and approximately midway between them, hooks for suspending the receptacles from this rail, a receiving-bar parallel to the rail, pawls on this bar their free ends resting upon the rail and adapted to reciprocate upon it and coöperate with the hooks by which the receptacles are suspended so that the receptacles are made to travel along the rail to the point at which it is desired they shall be delivered as set forth.

17. In a depository for coal or other broken or granulated material having outer walls by which the whole is floated the combination of a partition dividing the forward end of the depository into two longitudinal sections, a partition dividing the rearward end into two longitudinal sections, each section comprising an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed between the outlet between the lower side of the floor and the opposed wall of the chamber the table extending beneath the whole of the length of the outlet so that the material may be removed from several points simultaneously and projecting inwardly beneath the floor, a dumping-space between the forward and rearward sections, and means for transporting the material removed from each section to this dumping-space, as set forth.

18. In a depository for coal or other broken or granulated material having outer walls by which the whole is floated the combination of a partition dividing the forward end of the depository into two longitudinal sections, a partition dividing the rearward end into two longitudinal sections, each section comprising an upper chamber, a lower chamber, a floor between these chambers sloped downwardly toward one wall, means for supporting the lower side of this floor free of the opposed wall so that an outlet is left for the material to gravitate down the floor to the chamber below, a receiving-table in the lower chamber disposed between the outlet between the lower side of the floor and the opposed wall of the chamber the table extending beneath the whole of the length of the outlet so that the material may be removed from several points simultaneously and projecting inwardly beneath the floor, a dumping-space between the forward and rearward sections portable receptacles to receive the material as it is removed from the table, a stationary transporting-rail suspended in the lower chamber parallel to the receiving-table and extending out from the chamber to the dumping-space between the forward and rearward sections, hooks for suspending the receptacles from this rail, and means for moving the receptacles along the rail to the dumping-space as set forth.

19. In a depository for coal or other broken or granulated material having outer walls by which the whole is floated the combination of a partition dividing the forward end of the depository into two longitudinal sections, a partition dividing the rearward end into two longitudinal sections, each section comprising an upper chamber, a lower chamber, a floor between these chambers sloped downwardly toward one wall, means for supporting the lower side of the floor of the chamber free of the opposed wall so that an outlet is left for the material to gravitate down the floor to the chamber below, a receiving-table in the lower chamber disposed between the outlet between the lower side of the floor and the opposed wall of the chamber the table extending beneath the whole of the length of the outlet so that the material may be removed from several points simultaneously and projecting inwardly beneath the floor, a dumping-space between the forward and rearward sections, portable receptacles to receive the material as it is removed from the table, a stationary transporting-rail suspended in the lower chamber parallel to the receiving-table and extending out from the chamber to the dumping-space between the forward and rearward sections, hooks for suspending the receptacles from this rail, a reciprocating bar parallel with the rail, pawls on this bar their free ends resting upon the rail and adapted to reciprocate upon it and coöperate with the hooks by which the receptacles are suspended so that the receptacles are moved along the rail to the dumping-space as set forth.

20. In a depository for coal or other broken or granulated material, the combination with a partition dividing the depository into an upper chamber for the material and a lower chamber into which the material is received and handled, an outlet in the partition through which the material may gravitate to the lower chamber, and a receiving table or platform in the lower chamber below the outlet upon which the material falls and comes to rest and from which it may be subsequently removed; substantially as described.

In testimony whereof we have signed our names to this specification in the presence of two subscribing witnesses.

GEORGE COLBY MACKROW.
HERBERT GEORGE CAMERON.

Witnesses:
ABE HAYWARD,
H. D. JAMISON.